United States Patent
Nishiyama (10) Patent No.: US 10,853,952 B2
(45) Date of Patent: Dec. 1, 2020

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Tomohiro Nishiyama, Tama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 122 days.

(21) Appl. No.: 15/708,500

(22) Filed: Sep. 19, 2017

(65) Prior Publication Data

US 2018/0096486 A1 Apr. 5, 2018

(30) Foreign Application Priority Data

Sep. 30, 2016 (JP) .................. 2016-194776

(51) Int. Cl.
| | | |
|---|---|---|
| *G06K 9/00* | (2006.01) | |
| *G06T 7/246* | (2017.01) | |
| *G06T 7/55* | (2017.01) | |
| *G06T 7/292* | (2017.01) | |
| *G06T 7/33* | (2017.01) | |
| *G06T 7/73* | (2017.01) | |

(52) U.S. Cl.
CPC .............. *G06T 7/251* (2017.01); *G06T 7/292* (2017.01); *G06T 7/344* (2017.01); *G06T 7/55* (2017.01); *G06T 7/75* (2017.01); *G06T 2207/10028* (2013.01); *G06T 2207/30196* (2013.01)

(58) Field of Classification Search
CPC G06T 7/251; G06T 7/55; G06T 7/292; G06T 7/344; G06T 7/75; G06T 2207/10028; G06T 2207/30196
USPC ........................................ 382/103
See application file for complete search history.

(56) References Cited

U.S. PATENT DOCUMENTS

| | | | |
|---|---|---|---|
| 8,229,249 B2 | 7/2012 | Seki | |
| 9,646,201 B1* | 5/2017 | Horowitz | ........... G06K 9/00389 |
| 10,699,463 B2* | 6/2020 | Jiao | ......................... G06T 13/40 |
| 2010/0111370 A1* | 5/2010 | Black | ................. G06K 9/00369 |
| | | | 382/111 |
| 2011/0211754 A1* | 9/2011 | Litvak | ....................... G06T 7/73 |
| | | | 382/165 |
| 2013/0182079 A1* | 7/2013 | Holz | ...................... G06T 7/593 |
| | | | 348/47 |

(Continued)

FOREIGN PATENT DOCUMENTS

JP 4982410 B2 7/2012

*Primary Examiner* — Jonathan S Lee
(74) *Attorney, Agent, or Firm* — Rossi, Kimms & McDowell LLP (57) ABSTRACT

An image processing apparatus, comprising a generation unit configured to generate a three-dimensional shape model of an object present in a field, based on a plurality of captured images obtained by a plurality of cameras that capture the field from different directions, a specification unit configured to specify a direction of the three-dimensional shape model generated by the generation unit, and a storage control unit configured to cause the direction of the three-dimensional shape model specified by the specification unit to be stored in a storage unit together with identification information of the object.

16 Claims, 5 Drawing Sheets

(56) References Cited

U.S. PATENT DOCUMENTS

| | | | |
|---|---|---|---|
| 2014/0369558 A1* | 12/2014 | Holz | G06K 9/00201 |
| | | | 382/103 |
| 2015/0243039 A1* | 8/2015 | Holz | G06K 9/3233 |
| | | | 345/8 |
| 2019/0051045 A1* | 2/2019 | Nishiyama | G06T 1/20 |

* cited by examiner

OBJECT FROM ONE FRAME EARLIER

OBJECT FROM FRAME OF INTEREST

(N-1)TH FRAME

NTH FRAME

FIG. 6

IMAGE PROCESSING APPARATUS, IMAGE PROCESSING METHOD, AND NON-TRANSITORY COMPUTER-READABLE STORAGE MEDIUM

BACKGROUND OF THE INVENTION

Field of the Invention

The present invention relates to a technique for tracking an object.

Description of the Related Art

Techniques for tracking an object that moves have been conventionally proposed. Japanese Patent No. 4982410 discloses a technique for calculating a spatial movement amount of an object.

However, in the conventional technique, it is not possible to track both of a position and a direction of an object. The direction of an object here indicates, in the case where the object is a person for example, the orientation of the person's body, the orientation of their face, or the like.

SUMMARY OF THE INVENTION

According to the first aspect of the present invention, there is provided an image processing apparatus, comprising: a generation unit configured to generate a three-dimensional shape model of an object present in a field, based on a plurality of captured images obtained by a plurality of cameras that capture the field from different directions; a specification unit configured to specify a direction of the three-dimensional shape model generated by the generation unit; and a storage control unit configured to cause the direction of the three-dimensional shape model specified by the specification unit to be stored in a storage unit together with identification information of the object.

According to the second aspect of the present invention, there is provided an image processing method, comprising: generating a three-dimensional shape model of an object present in a field, based on a plurality of captured images obtained by a plurality of cameras that capture the field from different directions; specifying a direction of the generated three-dimensional shape model; and causing the specified direction of the three-dimensional shape model to be stored in a storage unit together with identification information of the object.

According to the third aspect of the present invention, there is provided a non-transitory computer-readable storage medium storing a program for causing a computer to execute an image processing method comprising: generating a three-dimensional shape model of an object present in a field, based on a plurality of captured images obtained by a plurality of cameras that capture the field from different directions; specifying a direction of the generated three-dimensional shape model; and causing the specified direction of the three-dimensional shape model to be stored in a storage unit together with identification information of the object.

Further features of the present invention will become apparent from the following description of exemplary embodiments (with reference to the attached drawings).

DESCRIPTION OF THE EMBODIMENTS

Below, explanation will be given for embodiments of the present invention with reference to the accompanying drawings. Note that embodiments described below merely illustrate examples of specifically implementing the present invention, and are only specific embodiments of a configuration defined in the scope of the claims.

First Embodiment

Figure 1:
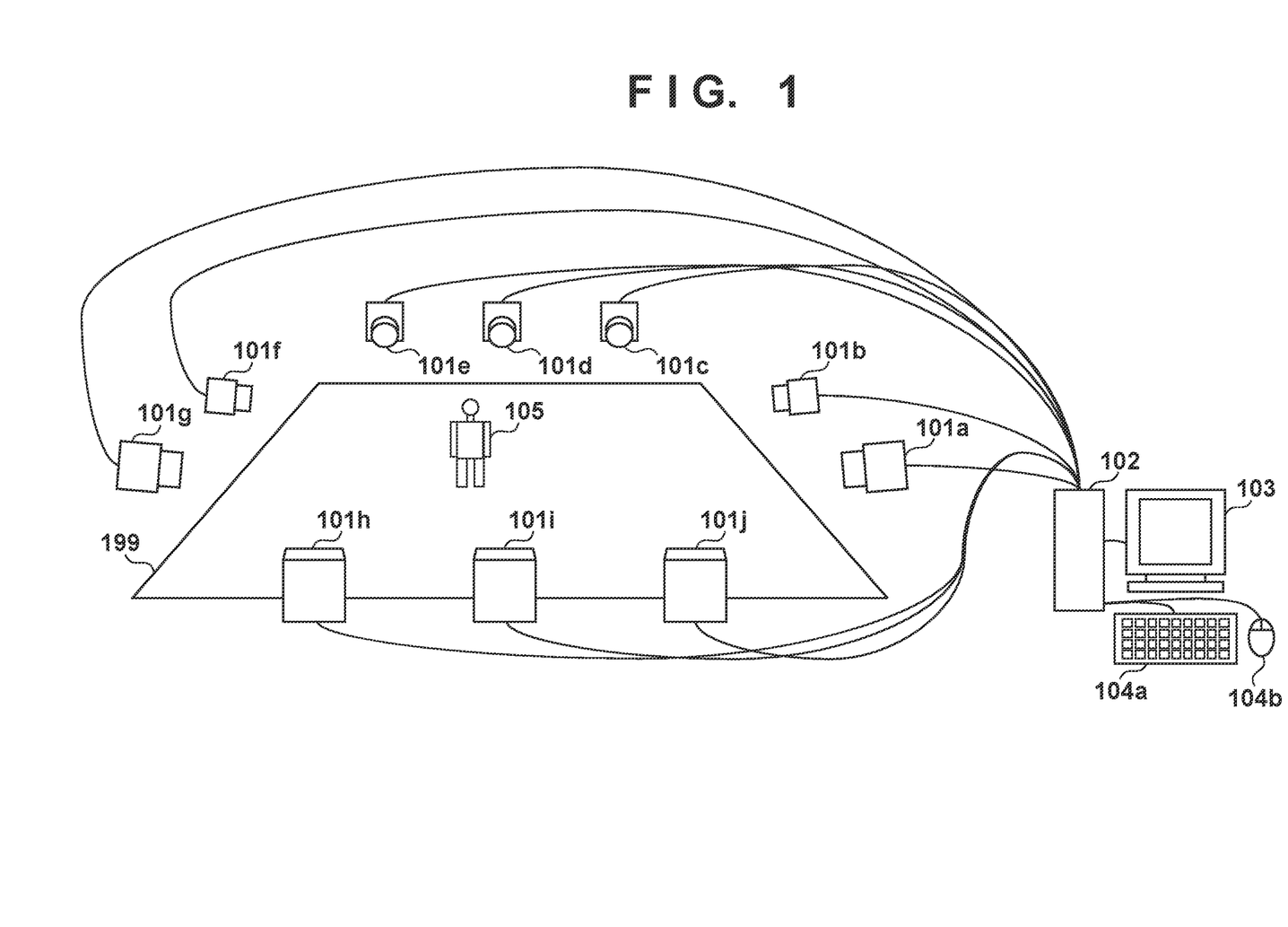
FIG. 1 is a view that illustrates an example of a configuration of a system.

Firstly, FIG. 1 is used to give an explanation regarding an example of a configuration of a system according to the present embodiment. Cameras 101a through 101j are each a camera that captures a moving image, and as illustrated by FIG. 1, are arranged around a field 199 (a field such as a stadium) facing the field 199. An image for each frame captured by each of the cameras 101a through 101j is sent to an image processing apparatus 102. FIG. 1 illustrates a person 105 as an object, but in the present embodiment it is assumed that a plurality of persons are positioned in the field 199 as objects. In addition an object is not limited to a person. For example, in the case where a capturing target is a soccer match, a ball can be detected as an object. Typically, an object is extracted from a captured image in accordance with rules that are set in advance.

The image processing apparatus 102 extracts outlines of an object from an image group sent from each of the cameras 101a through 101j. The image processing apparatus 102 then generates a three-dimensional shape model of the object by using corresponding outlines that were extracted from a plurality of images that were captured at (approximately) the same timing. In other words, the image processing apparatus 102 generates a three-dimensional shape model of the object for each timing. The three-dimensional shape model is something that represents the shape of the object by a point group, for example. Note that, when a plurality of objects are included in an image, a three-dimensional shape model is generated for each of the objects. Because a technique for generating a three-dimensional shape model of an object from outlines of the object extracted from a plurality of images is public knowledge, explanation relating to this technique is omitted. Note that a method for obtaining a three-dimensional shape model of an object is not limited to the method described above. For example, configuration may be taken such that a three-dimensional shape model of an object is obtained by using information of a sensor attached to an object (person). In addition, configuration may be taken such that a three-dimensional shape model is obtained by estimating a pose of the object from a shape of a partial region of the object (for example a limb), and another method may be used.

Various information, such as a three-dimensional shape model generated by the image processing apparatus 102, can be displayed to a display apparatus 103. A keyboard 104a and a mouse 104b are examples of user interfaces that a user operates to input information or various instructions to the image processing apparatus 102.

Figure 2:
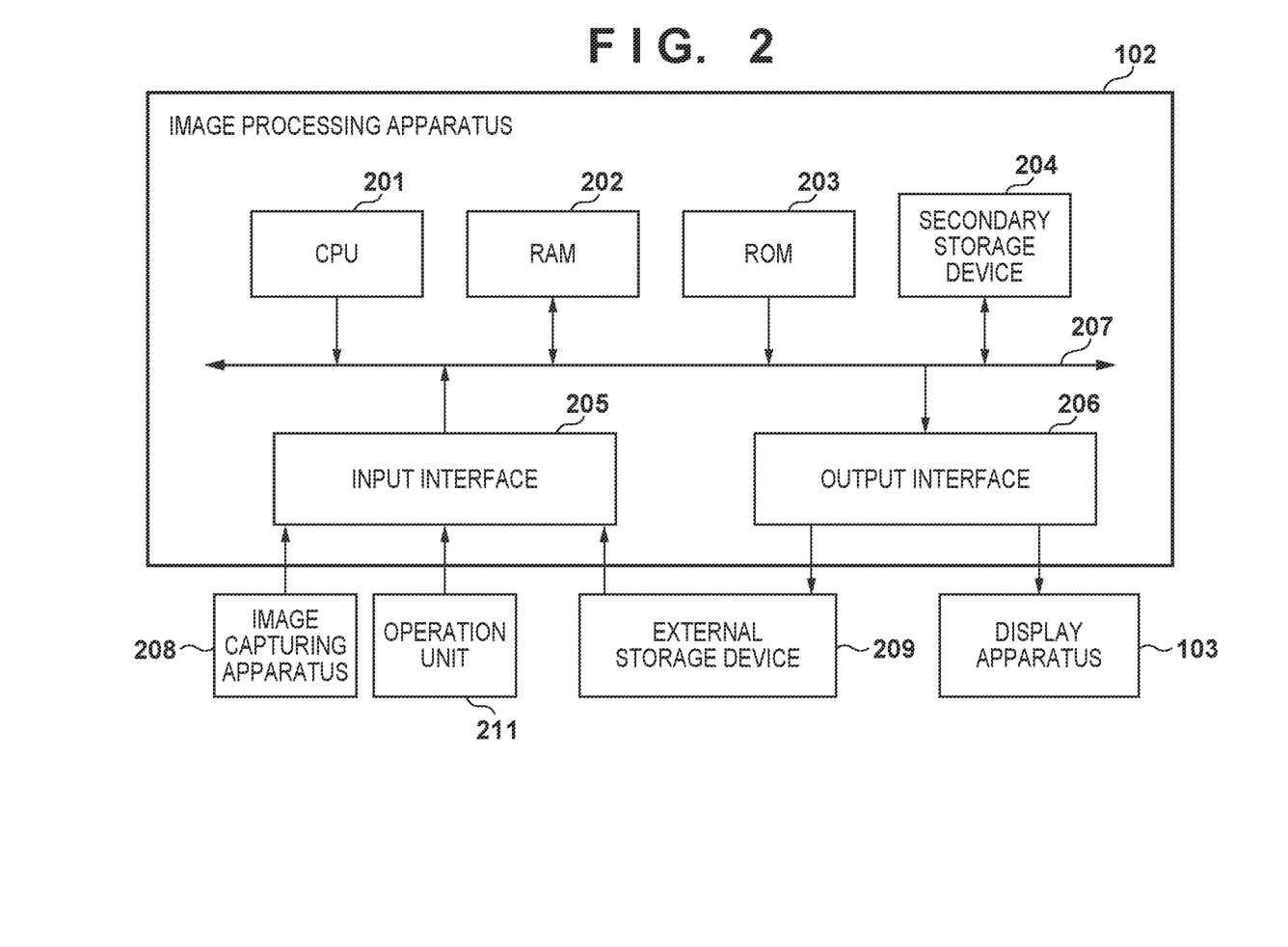
FIG. 2 is a block diagram that illustrates an example of a hardware configuration of an image processing apparatus 102.

Note that, the configuration of the system that is illustrated in FIG. 1 is merely an example, and for example a number of cameras, a position that the cameras observe, a network configuration between the cameras and the image processing apparatus 102, or the like are not limited to what is illustrated in FIG. 1. Next, the block diagram of FIG. 2 is used to give an explanation regarding an example of a hardware configuration of the image processing apparatus 102.

A CPU 201 executes various processing by using data and a computer program stored in a RAM 202 or a ROM 203. By this, the CPU 201 performs operation control of the image processing apparatus 102 overall, and also executes or controls all processing described later as something that the image processing apparatus 102 performs.

The RAM 202 has an area for storing a computer program or data loaded from a secondary storage device 204, an external storage device 209, or the ROM 203. In addition, the RAM 202 has a work area that is used when the CPU 201 executes or controls various processing. In this way, the RAM 202 can provide various areas as necessary. The ROM 203 stores, for example, a computer program or setting data that does not need to be rewritten.

The secondary storage device 204 is a large capacity information storage device typified by a hard disk drive device. The secondary storage device 204 stores an OS (operating system), as well as data or a computer program for causing the CPU 201 to execute the processing described below as something that the image processing apparatus 102 performs. This data includes what is described below as information known beforehand. Data or a computer program stored in the secondary storage device 204 is loaded into the RAM 202 as appropriate in accordance with control by the CPU 201, and becomes a target of processing by the CPU 201.

An operation unit 211 includes the aforementioned mouse 104b and the keyboard 104a, and by operation thereof a user can input various instructions to the CPU 201 via an input interface 205.

In FIG. 2, the aforementioned cameras 101a through 101j are represented as an image capturing apparatus 208. Accordingly, in the following explanation, a frame image of interest group outputted from the image capturing apparatus 208 means a frame image of interest group outputted from the cameras 101a through 101j. The image group for each frame outputted from the image capturing apparatus 208 is stored in the RAM 202 or the secondary storage device 204. The frame image of interest group is an image group obtained by capturing at (approximately) the same time by each image capturing apparatus 208. In other words, a frame image of interest group is an image group obtained by capturing at a corresponding timing (a timing of interest) by each of the image capturing apparatus 208.

The external storage device 209 performs reading or writing of data or a computer program with respect to a storage medium such as a CD-RW or a DVD-RW. Data or a computer program read from the storage medium by the external storage device 209 is outputted to the RAM 202 or the secondary storage device 204 via the input interface 205. Meanwhile, data or a computer program that the external storage device 209 writes to a storage medium is outputted to the external storage device 209 via an output interface 206 from the RAM 202 or the secondary storage device 204. In addition, configuration may also be taken to store some or all of data or a computer program, explained above as something stored in the secondary storage device 204, in a storage medium in advance, and read from the storage medium into the RAM 202 or the secondary storage device 204 by the external storage device 209.

The display apparatus 103 is configured by a CRT, a liquid crystal screen, or the like, and displays a result of processing by the CPU 201 by using an image, text, or the like. Note that a touch panel screen may be configured by integrating the operation unit 211 and the display apparatus 103. The CPU 201, the RAM 202, the ROM 203, the secondary storage device 204, the input interface 205, and the output interface 206 are all connected to a bus 207.

Figure 4:
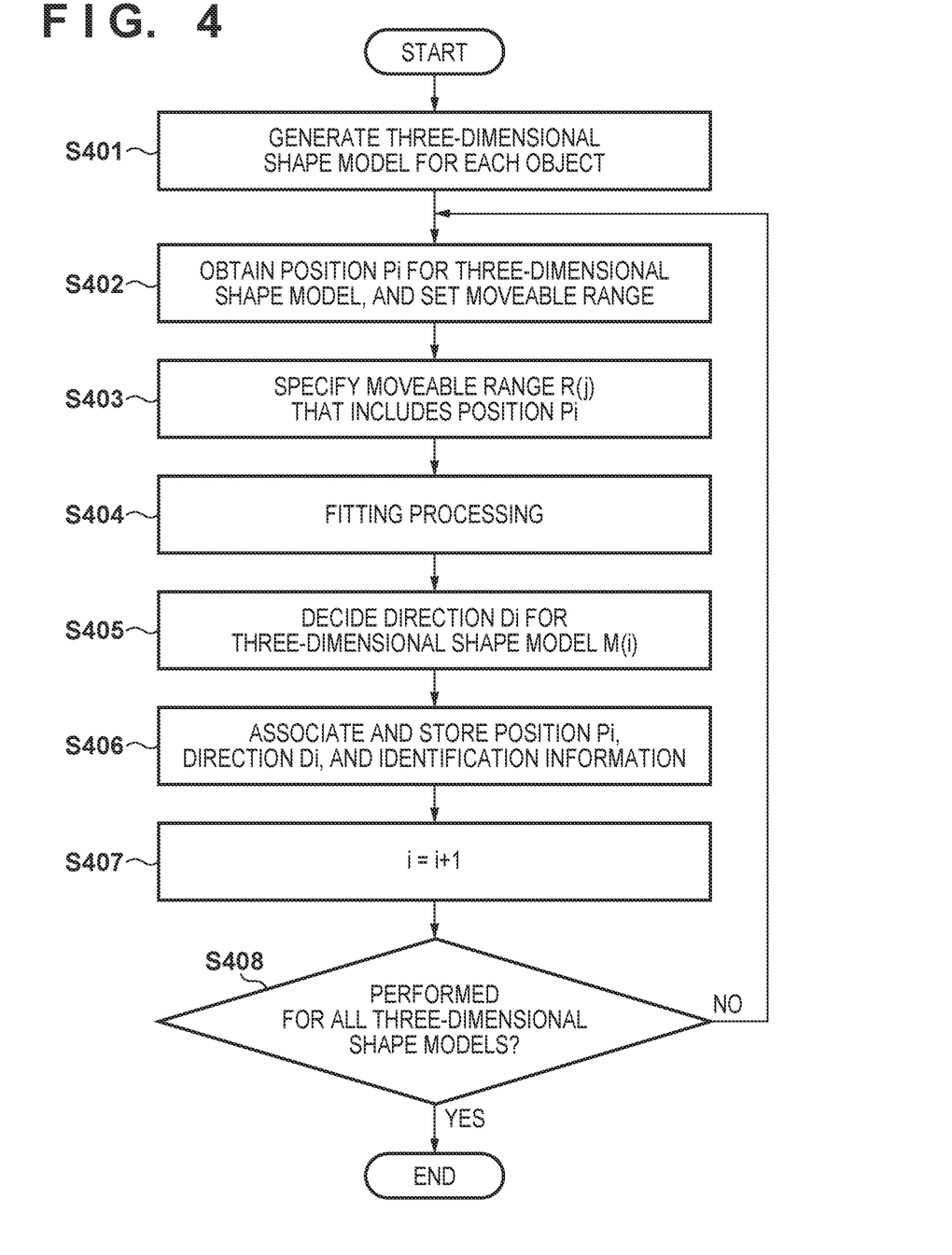
FIG. 4 is a flowchart for processing that the image processing apparatus 102 performs.

Next, explanation using the flowchart of FIG. 4 is given regarding processing that the image processing apparatus 102 performs when an image group (a plurality of objects are included in each image) of an Nth (N is an integer greater than or equal to 2) frame is inputted from the image capturing apparatus 208 to the image processing apparatus 102. Note that, in the present embodiment, because it is assumed that each image capturing apparatus 208 starts capturing at the same time and captures at the same frame rate, the image group of the Nth frame is an image group obtained by each image capturing apparatus 208 capturing at (approximately) the same timing. However, the capturing start timings by each image capturing apparatus 208 may be different, and the captured frame rate by each image capturing apparatus 208 may be different. For example, if the capturing start timings differ for each image capturing apparatus 208, an image group necessary for generating the three-dimensional shape model may be specified by using information of a time stamp for each captured image.

Note that, for processing in accordance with the flowchart of FIG. 4, it is assumed that an image group for a second or subsequent frame is taken as a target. Accordingly, before performing processing in accordance with the flowchart of FIG. 4, the CPU 201 performs processing as below for the image group of the first frame.

The CPU 201 generates a three-dimensional shape model for each object included in the image group of the first frame, and obtains a position of the three-dimensional shape model as a position of the three-dimensional shape model of the first frame. Because the three-dimensional shape model is configured by a point group as described above, for example, it is possible to set a centroid position of the point group as the position of the three-dimensional shape model (the position of the point group for example can be obtained from positions of the cameras 101a through 101j and the focal lengths thereof). Note that the position of the three-dimensional shape model is not limited to a centroid position of the entire point group that configures the three-dimensional shape model. For example, a centroid position of a point group that configures a head may be the position of the three-dimensional shape model.

Furthermore, for each three-dimensional shape model, the CPU 201 recognizes a uniform number or a face or the like of an object in an image region referred to when generating the three-dimensional shape model, and issues information unique to the recognized face or uniform number as identification information of the three-dimensional shape model.

Furthermore, for each three-dimensional shape model, the CPU 201 recognizes a direction of a face in the image region referred to when generating the three-dimensional shape model, and sets the recognized direction of the face as the direction of the three-dimensional shape model in the first frame. Note that, a method for obtaining a direction of the three-dimensional shape model by using an image region referenced when generating the three-dimensional shape model is not limited to this method. As a method for specifying a direction of a three-dimensional shape model by something other than a direction of a face, for example, it is possible to estimate a pose of an object based on a positional relationship of a limb, and specify a direction of a three-dimensional shape model based on the result. As another example, it is also possible to specify a direction of a three-dimensional shape model of an object based on image information of clothing worn by the object.

For each three-dimensional shape model, the CPU 201 stores a position of the three-dimensional shape model, a direction of the three-dimensional shape model, and identification information of the three-dimensional shape model in association in the RAM 202, the secondary storage device 204, or the like. Subsequently, the RAM 202 or the secondary storage device 204 which are a storage destination for information are collectively referred to as a memory. Note that the direction of a three-dimensional shape model in the present embodiment here indicates, in the case where an object is a person for example, the orientation of the person's body, the orientation of their face, or the like. In addition, an object is not limited to a person and may be an animal or the like, and there may be a case in which a plurality of persons are handled as one object.

Furthermore, for each three-dimensional shape model, the CPU 201 sets a movable range that indicates a moveable range from the position of the three-dimensional shape model in one frame. Explanation is given here regarding the movable range. A movable range set for the three-dimensional shape model A is a rectangular parallelepiped centered on the position of the three-dimensional shape model A. Note that the shape of the movable range is not limited to a rectangular parallelepiped, may be cubic, and the shape does not matter.

In step S401, the CPU 201 generates a three-dimensional shape model for each object included in the image group of the Nth frame. Each three-dimensional shape model generated in step S401 is denoted below as M(1), M(2), . . . , and M(I) (I is the total number of three-dimensional shape models generated in step S401). In addition, in step S401, the CPU 201 initializes a variable i used in the following explanation to "1".

In step S402, the CPU 201 selects one unselected out of M(1) through M(I) as a selected three-dimensional shape model M(i), and obtains a centroid position in M(i) (a point group) as a position Pi of M(i) in the Nth frame. Furthermore, the CPU 201 sets a rectangular parallelepiped centered on the position Pi as the movable range of M(i).

Figure 3:
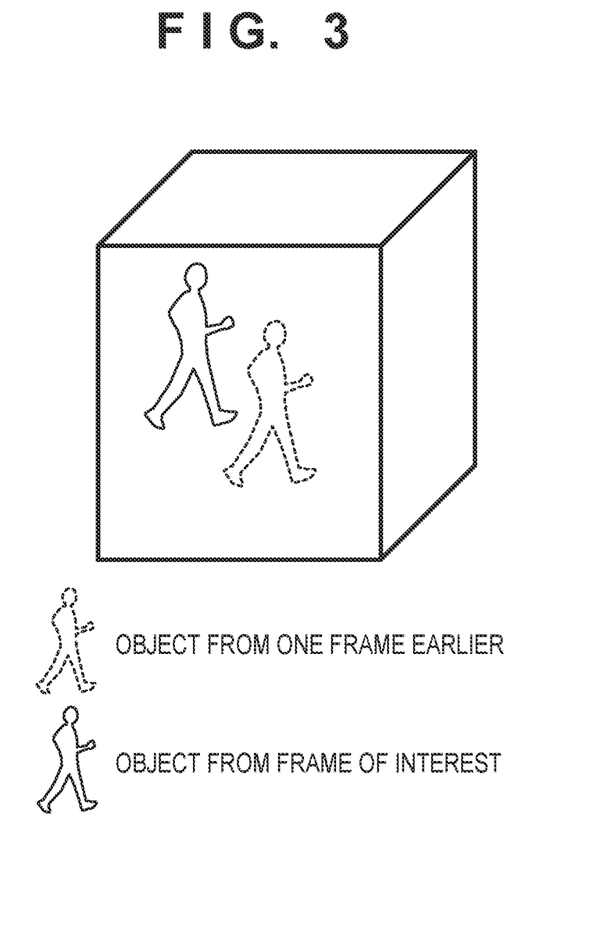
FIG. 3 is a view for explaining step S403.

Here, three-dimensional shape models generated from an image group of the (N−1)th frame are denoted as Q(1), . . . Q(J) (J is the total number of three-dimensional shape models generated from the image group of the (N−1)th frame. At this point, in step S403, the CPU 201 specifies a movable range R(j) that includes the position Pi obtained in step S402 out of the movable ranges R(1), . . . , R(J) respectively set for Q(1), . . . , Q(J). In other words, in step S403, it is regarded that the position Pi is present inside the movable range R(j)=Q(j) and M(i) are close, and as a result it is regarded that Q(j) and M(i) are three-dimensional shape models of the same object (FIG. 3).

In step S404, the CPU 201 performs fitting processing that fits an approximation model that approximates the shape of a cross section with respect to the cross section (a cross section parallel to a floor surface) of a location corresponding to an abdominal region of M(i) (for example, a location corresponding to an average height from a floor surface to an abdominal region). In the fitting processing, a pose of approximation model is caused to change so that the shape of the approximation model fits to a maximum with a cross-sectional shape of a location that corresponds to an abdominal region of M(i), and a pose of the approximation model when the shape of the approximation model most fits the cross-sectional shape is obtained. Because approximation is possible when the cross-sectional shape of a location that corresponds to the abdominal region of M(i) is an ellipse, the approximation model is given as "a model of an ellipse at a plane parallel to the floor surface", but a model of another shape may be used as the approximation model.

Here, there are two directions that follow the minor axis of the approximation model (an ellipse) for which the pose is finalized by the fitting processing: one direction and another direction that is an opposite direction thereto, and either direction indicates "a direction in which a front surface of M(i) faces". Accordingly, in step S405, the CPU 201 specifies a direction vector for which the value of an inner product with a direction vector that indicates a direction that has been decided as the direction of Q(j) is larger, out of respective direction vectors for the two directions of the minor axis directions of the approximation model for which the pose has been decided. In other words, the CPU 201 specifies a direction vector of a direction that is closer than the decided direction as the direction of Q(j), out of respective direction vectors for the two directions of the minor axis directions of the approximation model for which the pose has been decided. The CPU 201 then decides a direction that the specified direction vector indicates as a direction Di of M(i) in the Nth frame.

In step S406, the CPU 201 associates the identification information of Q(j), the position Pi for M(i) obtained in step S402, and the direction Di of M(i) decided in step S405, and stores them in the memory. By this, it is possible to store the identification information, the position, and the direction of M(i) in the Nth frame in the memory. In step S407, the CPU 201 increments the index i by 1.

In step S408, the CPU 201 determines whether or not an unselected three-dimensional shape model out of all of the three-dimensional shape models generated in step S401 remains. As a result of the determination, if an unselected three-dimensional shape model out of all of the three-dimensional shape models generated in step S401 remains (i≤I), the processing returns to step S402. Meanwhile, if an unselected three-dimensional shape model out of all of the three-dimensional shape models generated in step S401 does not remain (i>I), the processing in accordance with the flowchart of FIG. 4 ends for the image group of the Nth frame. Processing of step S401 and thereafter is then performed for the image group of the (N+1)th frame.

<Variation>

In the first embodiment, a model that simulates a cross-sectional shape of an abdomen in a cross section parallel to a floor surface is used as an approximation model. However, another model may be used as the approximation model. For example, a model that simulates the shape of a typical person's face may be used as the approximation model. In such a case, configuration may be taken to perform fitting processing between a selected three-dimensional shape model and the approximation model, and set the pose of the approximation model in the case of a maximum fit to the direction of the selected three-dimensional shape model as is. In such a case, it is possible to omit step S405 of FIG. 4, at the least.

In addition, configuration may be taken to fit an approximation model to a shoulder portion instead of fitting an approximation model to an abdominal region of a selected three-dimensional shape model. In addition, it is also possible to specify the direction of the selected three-dimensional shape model by combining a result of fitting an abdominal region and a shoulder portion. In addition, the direction of a selected three-dimensional shape model may be specified based on information of a positional relationship of limbs of a person that corresponds to the selected three-dimensional shape model, or the direction or the selected three-dimensional shape model may be specified by combining a plurality of the methods described above.

In addition, in the present embodiment, although explanation is given mainly of an example of a case in which the abdominal region of a selected three-dimensional shape model is a cross section parallel to a floor surface, there is no limitation to this. For example, it may have a certain amount of angle with respect to the floor surface if there is unevenness on the floor surface or if the floor surface is inclined. In addition, the abdominal region may be caused to have an angle, in accordance with a pose of the person that corresponds to the selected three-dimensional shape model.

In addition, for three-dimensional shape models having the same identification information, there is no need to store the identification information for each frame, and configuration may be taken such that a set of the identification information, position and direction is stored for the first frame, and for second and subsequent frames a position and a direction are stored in association with this set.

Second Embodiment

Figure 5:
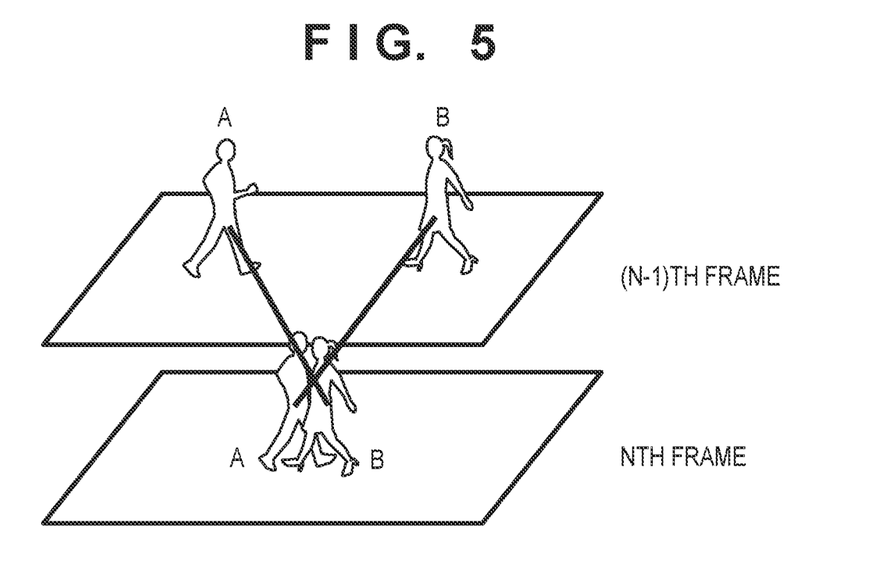
FIG. 5 is a view for explaining a second embodiment.

As illustrated in FIG. 5, consideration may be given for a case where an object A and an object B are somewhat separated in an (N−1)th frame, the object A and the object B become close in the Nth frame. When the object A and the object B become close during tracking of the position and direction of the object A, there is a possibility that the object B will be confused for the object A, and the object B is mistakenly tracked as the object A. The image processing apparatus according to the present embodiment is something that handles this issue. Explanation is given below predominantly regarding differences with the first embodiment, and is assumed to be the same as the first embodiment to the extent that something is not touched upon in particular below.

Figure 6:
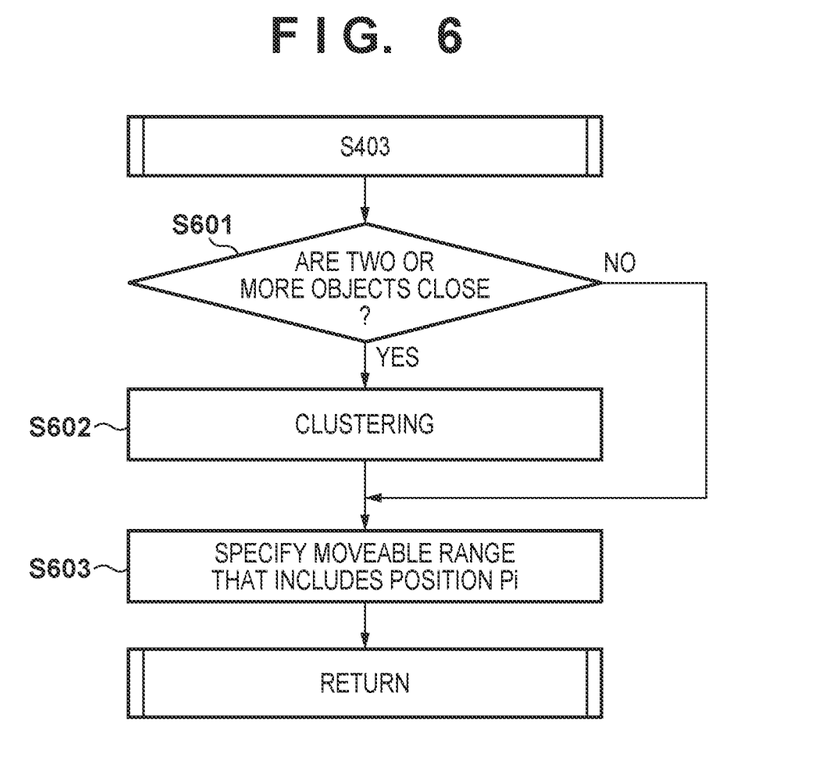
FIG. 6 is a flowchart of processing of step S403.

In the present embodiment, processing in accordance with the flowchart of FIG. 6 is performed in step S403. In step S601, the CPU 201 determines whether two or more objects are close to one another. As a result of this determination the processing proceeds to step S602 if two or more objects are close to one another, and the processing proceeds to step S603 if a case where two or more objects are close to one another has not occurred. Various processing can be applied to the processing for the determination in step S601.

For example, a volume of a movable range set for each three-dimensional shape model is obtained. In a case where two or more movable ranges have a portion where they overlap—in other words in the case where two or more movable ranges unify to form one unified range—the volume of this unified range is obtained. The CPU 201 then determines whether one out of the obtained volumes has a volume larger than a volume that is a specified multiple (a number greater than or equal to 1) of the volume of one movable range—in other words whether there is a unified range that has a volume greater than or equal to a specified volume. As a result of the determination, if there is a unified range that has a volume greater than the specified volume, it is determined that two or more objects are close to one another. If a unified range that has a volume greater than or equal to a specified volume is not present, it is determined that a case in which objects are close to one another has not occurred.

In addition, the position of each three-dimensional shape model is used to obtain distances between three-dimensional shape models, and determine whether there are three-dimensional shape models for which an obtained distance is less than or equal to a threshold value. As a result of the determination, if there are three-dimensional shape models for which the obtained distance is less than or equal to the threshold value, it is determined that two or more objects are close. If there are no three-dimensional shape models for which the obtained distance is less than or equal to the threshold value, it is determined that a case in which objects are close to each other has not occurred. Note that a method of determining closeness is not limited to the method described above, and for example close/not close may be determined based on data that from a sensor that an object (person) has, or close/not close may be determined by using other image processing.

In step S602, the CPU 201 clusters the unified range in the (N−1)th frame by three-dimensional shape model. For example, in a case of forming a unified range by the movable range of a three-dimensional shape model A and the movable range of an object B, the unified range is clustered into a range that includes the position of the three-dimensional shape model A and a range that includes the three-dimensional shape model B. Note that, in step S602, a method in which each movable range that forms the unified range is reduced so that there are no ranges that overlap each other may be considered. In addition, although explanation has been given above regarding an example in which subjects of an (N−1)th frame that have close distances are linked with subjects in the Nth frame, a different way of linking, such as a case where subjects are close in the (N−1)th frame and intersect in the Nth frame, may be used. For example, linking may be performed by also using orientation information of subjects in the (N−1)th frame or information projected on an image (unique information used in specification such as a face or a uniform number).

In step S603, the CPU 201 specifies the movable range that includes the position Pi obtained in step S402 out of each of the ranges clustered in step S602 or the movable ranges set for the three-dimensional shape models in the (N−1)th frame. The processing then returns to step S404.

Third Embodiment

The system according to the first and second embodiments can also be used for an objective of capturing a situation where a game of a sport such as soccer or rugby is being played in the field 199 by the image capturing apparatus 208, and tracking and storing in a memory positions and directions of players as objects. In such a case, configuration may be taken such that the image processing apparatus 102 generates a three-dimensional shape model of a ball from an image in addition to the operations described above, and stores the position of this three-dimensional shape model in the memory for each frame. By this, it is also possible to track a three-dimensional trajectory of the ball in addition to tracking the positions and directions of players.

By virtue of the present embodiment, it is possible to track the direction as well as the position of an object as a moving body.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-194776, filed Sep. 30, 2016 which is hereby incorporated by reference herein in its entirety.

What is claimed is:

1. An image processing apparatus, comprising:
one or more memories storing instructions,
one or more processors executing the instructions to:
obtain a three-dimensional shape model of an object, which is based on a plurality of images captured by a plurality of image capturing apparatuses,
obtain identification information of the object;
specify a direction of the obtained three-dimensional shape model based on a specification result of a direction of a prior three-dimensional shape model being obtained prior to the obtained three-dimensional shape model, wherein the prior three-dimensional shape model corresponds to the obtained three-dimensional shape model; and
output information representing the specified direction of the obtained three-dimensional shape model in association with the obtained identification information,
wherein the direction of the obtained three-dimensional shape model is specified further based on a shape of a particular cross-section of the obtained three-dimensional shape model,
a plurality of candidates regarding the direction of the obtained three-dimensional shape model are specified by fitting processing that fits a model of an ellipse with respect to the particular cross section of the obtained three-dimensional shape model and include directions that follow axis of the ellipse, and
a direction that is closer than a specified direction of the prior three-dimensional shape model is specified out of the directions that follow axis of the ellipse.

2. The image processing apparatus according to claim 1, wherein
the object is a person, and
the direction of the obtained three-dimensional shape model is specified based on a shape of a cross-section of an abdominal region of the person that the obtained three-dimensional shape model represents.

3. The image processing apparatus according to claim 1, wherein
the object is a person, and
the direction of the obtained three-dimensional shape model is specified further based on a shape of a plurality of cross-sections of the person that the obtained three-dimensional shape model represents.

4. The image processing apparatus according to claim 1, wherein
the object is a person, and
the direction of the obtained three-dimensional shape model is specified further based on a positional relationship of limbs of the person that the obtained three-dimensional shape model represents.

5. The image processing apparatus according to claim 1, wherein
the object is a person, and
the direction of the obtained three-dimensional shape model is specified further based on a direction of a face of the person that the obtained three-dimensional shape model represents.

6. The image processing apparatus according to claim 1, wherein the one or more processors
further execute the instructions to associate, in accordance with a distance between a first object present on a field at a first timing and a second object present on the field at a second timing later than the first timing, the first object and the second object as the same person,
wherein one direction from a plurality of candidates relating to a direction of a three-dimensional shape model corresponding to the second object is specified using a specification result of a direction of a three-dimensional shape model corresponding to the first object.

7. The image processing apparatus according to claim 6, wherein the distance varies in accordance with information relating to a degree of congestion of a plurality of objects.

8. An image processing method, comprising:
obtaining a three-dimensional shape model of an object, which is based on a plurality of images captured by a plurality of image capturing apparatuses, and obtaining identification information of the object;
specifying a direction of the obtained three-dimensional shape model based on a specification result of a direction of a prior three-dimensional shape model being obtained prior to the obtained three-dimensional shape model, wherein the prior three-dimensional shape model corresponds to the obtained three-dimensional shape model faces; and
outputting information representing the specified direction of the obtained three-dimensional shape model in association with the obtained identification information,
wherein the direction of the obtained three-dimensional shape model is specified further based on a shape of a particular cross-section of the obtained three-dimensional shape model, a plurality of candidates regarding the direction of the obtained three-dimensional shape model are specified by fitting processing that fits a model of an ellipse with respect to the particular cross section of the obtained three-dimensional shape model and include directions that follow axis of the ellipse, and a direction that is closer than a specified direction of the prior three-dimensional shape model is specified out of the directions that follow axis of the ellipse.

9. A non-transitory computer-readable storage medium storing a program for causing a computer to execute an image processing method comprising:

obtaining a three-dimensional shape model of an object, which is based on a plurality of images captured by a plurality of image capturing apparatuses, and obtaining identification information of the object;

specifying a direction of the obtained three-dimensional shape model based on a specification result of a direction of a prior three-dimensional shape model being obtained prior to the obtained three-dimensional shape model, wherein the prior three-dimensional shape model corresponds to the obtained three-dimensional shape model faces; and outputting information representing the specified direction of the obtained three-dimensional shape model in association with the obtained identification information, wherein the direction of the obtained three-dimensional shape model is specified further based on a shape of a particular cross-section of the obtained three-dimensional shape model, a plurality of candidates regarding the direction of the obtained three-dimensional shape model are specified by fitting processing that fits a model of an ellipse with respect to the particular cross section of the obtained three-dimensional shape model and include directions that follow axis of the ellipse, and a direction that is closer than a specified direction of the prior three-dimensional shape model is specified out of the directions that follow axis of the ellipse.

10. The image processing apparatus according to claim 1, wherein the specified direction of the obtained three-dimensional shape model is output to one or more storage devices.

11. The image processing apparatus according to claim 10, wherein the one or more storage devices include at least one of the one or more memories.

12. The image processing apparatus according to claim 1, wherein the object is a person and the direction of the obtained three-dimensional shape model is specified further based on a positional relationship of limbs of the obtained three-dimensional shape model.

13. The image processing apparatus according to claim 1, wherein the direction of the obtained three-dimensional shape model includes a direction vector.

14. The image processing apparatus according to claim 1, wherein the direction of the obtained three-dimensional shape model indicates a direction in which a front surface of the obtained three-dimensional shape model faces.

15. The image processing apparatus according to claim 5, wherein the direction of the face of the person is determined using an image that is used for generating a three-dimensional shape model.

16. The image processing apparatus according to claim 1, wherein the obtained three-dimensional shape model is based on images of a given frame that the plurality of image capturing apparatuses captured an object, and the prior three-dimensional shape model is based on images of a prior frame, prior to the given frame, that the plurality of image capturing apparatuses captured the object.

* * * * *